United States Patent [19]

Forschirm

[11] Patent Number: 4,851,081

[45] Date of Patent: Jul. 25, 1989

[54] PROCESS FOR PREPARING CONDUCTIVE PLASTIC ARTICLES

[75] Inventor: Alex Forschirm, Parsippany, N.J.

[73] Assignee: Celanese Engineering Resins, Chatham, N.J.

[21] Appl. No.: 213,909

[22] Filed: Jun. 30, 1988

[51] Int. Cl.$^4$ .................. B44C 1/22; B29C 37/00
[52] U.S. Cl. ..................... 156/668; 156/654; 252/79.2; 427/222; 427/307
[58] Field of Search ............. 427/212, 222, 307; 156/654, 668; 252/79.2

[56] References Cited

U.S. PATENT DOCUMENTS

| | | | |
|---|---|---|---|
| 2,721,357 | 11/1955 | Hochberg | 427/222 X |
| 3,489,590 | 1/1970 | Herwig | 427/222 X |
| 3,967,010 | 6/1976 | Maekawa | 427/307 X |
| 4,496,627 | 1/1985 | Azuma et al. | 427/222 X |

Primary Examiner—William A. Powell
Attorney, Agent, or Firm—Herbert P. Price; David J. Roper

[57] ABSTRACT

Conductive plastic articles are prepared by forming plastic pellets, etching the pellets in an etching bath, treating the pellets with a palladium-tin catalyst solution and an acidic accelerator, coating the pellets with metal, and heating the coated pellets.

48 Claims, No Drawings

PROCESS FOR PREPARING CONDUCTIVE PLASTIC ARTICLES

BACKGROUND OF INVENTION

The field of art to which this invention pertains is conductive plastics and a process for producing conductive plastic articles.

It is well known in the art that plastics can be made conductive by the incorporation of carbon black. See, for example, U.S. Pat. Nos. 4,465,616, 4,526,952, and 4,559,164. It is well known that thermoplastic compositions can be made electrically conductive by the incorporation of carbon and metallic fibers into a thermoplastic resin matrix.

U.S. Pat. No. 3,687,881 discloses that zinc dust may be added to synthetic and natural rubbers to promote resistance of the rubbers to aging and reversion. It, however, does not disclose that zinc dust may be used to prepare conductive polymer compositions.

U.S. Pat. No. 4,642,202 discloses that metal powders or particles may be used alone or with carbon black to prepare conductive rubber compositions. U.S. Pat. No. 4,552,688 discloses electroconductive silicon elastomer compositions wherein nickel coated carbon is added to a silicon elastomer to prepare a composition having a low resistivity. In U.S. Pat. No. 4,545,926, various polymer compositions are rendered conductive by the dispersion of conductive particles, such as various metal particles, within the polymeric material. U.S. Pat. No. 3,440,181 discloses that electrically conductive polymer compositions may be produced by uniformally dispersing from five to sixty weight percent of metal coated vermicular graphite into a solid organic polymer. However, none of these patents discloses a process whereby plastic articles are made conductive by the incorporation of metal coated plastic pellets into the plastic articles.

In order to apply coatings to plastics, various approaches have been taken in the prior art. For example, in Canadian Pat. No. 744,024, a primer coating composition for acetal plastic surfaces is disclosed. The composition is comprised of a film forming polymer, a phosphoric acid ester, and a boron trifluoride catalyst. The composition is applied to an acetal article and then baked to form a primer coating to which decorative coatings can be applied.

U.S. Pat. No. 3,141,789 discloses a coating composition for coating polyoxymethylene. The composition is comprised of a nitrocellulose, a sulfonamide, a formaldehyde resin former and a non-volatile acid. After the composition is applied to a polyoxymethylene substrate, it is baked to form a coating to which a variety of top coats can be applied.

U.S. Pat. No. 3,595,718 discloses a process for etching plastic surfaces, such as acetal surfaces. A high surface carrier, such as diatomaceous earth, that has been impregnated with an etching agent, such as an organic or inorganic acid, is used to treat a plastic article. The article can be buried in a bed of the impregnated carrier. After treatment, the article is more receptive to coatings.

In U.S. Pat. No. 4,418,162, a method for treating the surface of polyacetal resin articles is disclosed. The article is treated with an acidic solution containing hydrochloric and sulfuric acid. After such treatment, the article can be non-electrically plated with a nickel plating solution. The patent also discloses that the polyacetal resin preferably contains calcium carbonate.

U.S. Pat. No. 3,414,427 discloses a method for catalysing the surface of a material to be plated with metal. The surface is first immersed in a catalyst solution containing a complex of palladium chloride with hydrogen halide and water dissolved in an organic solvent and then is immersed in a plating bath, such as a nickel hypophosphite bath. The patent, however, does not disclose that the article should be etched in an acid bath before being treated with the catalysing solution.

In U.S. Pat. No. 4,066,809, a process for preparing a dielectric material for electroless deposition of a conductive material thereon is disclosed. The process consists of contacting a dielectric substrate with a stannous chloride sensitizing solution to deposit a layer of tin cations on the substrate, rinsing the stannous chloride from the substrate with hot water, contacting the substrate with a palladium chloride activator, contacting the substrate with a palladium chloride/stannous chloride/hydrochloric acid seeder bath, baking and then coating the substrate. The patent, however, does not disclose that the article should be etched with acid before being treated with a palladium-tin catalyst solution.

None of these patents relating to the coating of plastics, however, discloses a process whereby metal particles can be incorporated into a plastic article to render the article conductive.

One of the problems in the prior art with the use of carbon black to make plastic articles conductive is that the handling of carbon black can cause environmental problems, such as air pollution and breathing problems. Another problem is that when metal powder is used to make plastic articles conductive, the density difference between the powder and the plastic polymer can result in a settling of the metal powder so that a non-uniform distribution of metal particles within the article results.

Accordingly, it is an object of this invention to prepare plastic articles wherein there is a uniform distribution of metal particles within the article.

It is a further object of this invention to prepare condutive plastic articles.

These objects are obtained by the process of this invention.

SUMMARY OF INVENTION

This invention relates to plastic articles. In one respect, this invention pertains to conductive plastic articles. In another aspect, this invention relates to plastic articles containing metal particles.

The process for preparing a conductive plastic article comprises the steps of:
(1) preparing plastic pellets;
(2) etching the plastic pellets;
(3) coating the pellets with metal; and
(4) heating the pellets to form a conductive plastic article.

DESCRIPTION OF INVENTION

Any thermoplastic enginnering resin that can be plated with metal may be employed to prepare the articles of this invention. Examples of suitable plastic polymers include platable grade nylons, polysulfones, polyesters, polycarbonates, polypropylenes polyacetals, and polymers and copolymers of acrylonitrile and styrene (e.g., styrenes, styrene-acrylonitrile resins and acrylonitrile-butadiene-styrene polymers). The preparation of these plastics is well known to those skilled in the art. The preferred plastic polymer, however, is polyacetal.

The polyacetals that can be employed to prepare the articles of this invention include the addition homopolymers, copolymers terpolymers and the interpolymers of aldehydes, such as formaldehyde, and cyclic oligomers, such as trioxane.

The preparation of polyacetals is well known in the art. Generally, aldehydes are polymerized by initiators to form polyacetals. For example, formaldehyde can be polymerized by cationic or anionic initiators, such as common acids and bases, Lewis acids, and amines. The formaldehyde monomer can be readily polymerized either in bulk, from a non-reactive medium or directly as a vapor. Typically, the homopolymers are prepared by the polymerization of anhydrous formaldehyde or by the polymerization of trioxane, which is a cyclic trimer of formaldehyde.

Trioxane can be used to prepare high molecular weight polyacetal resins by employing cationic initiators either in bulk or dissolved in an inert medium, such as cyclohexane. High molecular weight polyoxymethylenes have alos been prepared by polymerizing trioxane in the presence of certain fluoride catalysts, such as antimony fluoride, and may also be prepared in high yields and at rapid reaction rates by the use of catalysts comprising boron fluoride coordinate complexes with organic compounds.

Acetal resins can also be prepared by copolymerization of trioxane and alkylene oxides or by the polymerization of higher aldehydes, such as isobutyraldehydes. Oxymethylene polymers that are particularly adapted for use in the present invention are oxymethylene copolymers, which may be prepared as described in U.S. Pat. No. 3,027,352, which is incorporated herein by reference, by copolymerizing, for example, trioxane with any of various cyclic ethers having at least two adjacent carbon atoms, e.g., ethylene oxide, dioxolane, and the like.

The homopolymers are usually stabilized against thermal degradation by end-capping or the incorporation therein of stabilizer compounds such as described in U.S. Pat. No. 3,133,896. High molecular weigth acetal resins can be stabilized through esterification.

Two of the acetal resins that are available commercially are Celcon ® resin, an acetal copolymer of trioxane which is available from Hoechst Celanese Corporation and Delrin ® resin, an acetal homopolymer resin of formaldehyde available from E. I. du Pont de Nemours & Co. The preparation of the Celcon ® resin is described and claimed in U.S. Pat. No. 3,027,352.

It is preferred that the polyacetal resins that are employed in the process of this invention contain calcium carbonate. The presence of calcium carbonate improves the plating adhesion of materials prepared from polyacetal resins. Preferably, the polyacetal resin contains from about one half to ten percent by weight and preferably about one to about five percent by weight calcium carbonate based upon the total weight of the polyacetal resin and calcium carbonate. The presence of calcium carbonate also improves the rigidity of a shaped article prepared from polyacetal resins.

The calcium carbonate suitable for use in the present invention can be light calcium carbonate, chalk or heavy calcium carbonate. Generally, the coarser the particles, the greater the improvement in plating adhesion. However, larger particles tend to reduce the surface gloss of the polyacetal article. In the present invention, calcium carbonate is added to and mixed with the polyacetal resin by any suitable means, such as by extrusion from a single screw extruder, and then the resin is employed to prepare pellets (or used later to prepare an article).

The plastics suitable for use in the present invention can be mixed with various pigments, additives and fillers before they are formed into pellets and conductive articles. Generally, the additives, etc. are mixed with the polymer by tumbling them in a fiber drum, placing the mixture in an extrusion screw machine, and then melt extruding the polymer and additives, etc. through a die to form a strand. The strand is generally cooled in water and then chopped into pellets by means of rotating knife blades. The strands may be cut while they are cooled under water or after they are removed from the water. Pellets prepared by cutting the strands under water tend to be more spherical than these prepared from strands that are cut after being cooled in water. Generally, the size of the pellets is in the range of about 0.06 inch to about 0.166 inch in diameter.

After the pellets are prepared, they are modified by etching to make the surface of the pellets more receptive to metal atoms and ions. The pellets are dipped into an etching bath. The composition of the etching bath will vary depending upon the plastic being employed. The type of etching baths or solvents that should be employed for each particular type of plastic are well known to those skilled in the art. For example, some plastics can be etched with organic solvents such as tetrahydrofuran, dimethylsulfoxide, dimethylformamide, and acetone, and acryonotrile-butadiene-styrene polymers can be etched with a sulfuric acid/chromic acid bath.

A process for etching polyacetal articles to make them more receptive to coatings is disclosed in commonly owned U.S. pat. application Ser. No. 07/156,216, filed 02/16/88 and a process for coating polyecetal articles with metal is disclosed in commonly owned U.S. pat. application Ser. No. 07/184,759, filed 04/22/88.

For polyacetal pellets, the etching bath will generally contain from about fifteen to about fifty percent by volume sulfuric acid, about five to about twenty percent by volume concentrated hydrochloric acid and about thirty to about eighty percent by volume water. Preferably, the bath will contain about thirty five percent by volume sulfuric acid, about fifteen percent by volume concentrated hydrochloric acid, and about fifty percent by volume water.

Generally, the etching bath is at a temperature in the range of about 60° F. to about 90° F., and usually is at the ambient temperature. Preferably, the bath is at a temperature in the range of about 70° F. to about 80° F. The pellets are usually held in the etching bath for about five to about thirty minutes, and preferably about fifteen to about twenty minutes.

After the pellets are etched by the etching bath, they are subjected to neutralization and washing with water to remove acid if an acid bath was employed. Preferably, the pellets are immersed in a neutralizing bath of sodium hydroxide and then are rinsed with water.

Although the pellets may be coated with metal without further treatement after being etched, it is preferable to treat the pellets with a palladium-tin catalyst solution prior to being metal coated. Treatment of the pellet with a palladium-tin catalyst solution results in the deposition of palladium and tin on the surface of the pellets. The solution is comprised of palladium chloride, stannous chloride and hydrochloric acid. Generally, the bath contains from about 1.2 to about 2.5 grams of palladium chloride, from about 80 to about 150 grams of stannous chloride (i.e. $SnCl_2.2H_2O$), and between 280 and about 360 milliliters of concentrated hydrochloric acid (e.g., 37% HCl) per liter of solvent. Preferably, the solution contains about 1.5 to about 2.0 grams of palladium chloride, about 90 to about 110 grams of stannous chloride, and about 280 to abut 300 millileters of concentrated hydrochloric acid per liter of solvent.

Commercially available palladium-tin catalyst solutions may also be employed. A suitable example of these is Macdermmid's D-34 which is available from the Macdermid Company. The Macdermmid D-34 solution is a colloidal dispersion of palladium chloride and stannous chloride in hydrochloric acid and water.

Generally, the palladium chloride and stannous chloride are dissolved or dispersed in water, preferably deionized water, but other suitable solvents that do not react with the plastic resins employed, adversely affect the pellets, or impair the deposition and catalytic activity of palladium may be employed.

The pellets are immersed in the palladium-tin catalyst solution for a period of time in the range of about 1 to about 5 minutes and preferably about 2 to about 3 minutes. After being removed from the solution, the article is rinsed. This step of the process can be repeated one or more times in order to increase the amount of palladium deposited on the pellets.

Next, the pellets are immersed in a solution containing an acidic accelerator. The acidic accelerator removes tin ions from the surface of the article while leaving palladium nucleii on the article. The paladium metal atoms that remain on the surface of the pellets help to reduce metallic ions, such as nickel and copper, so that such metallic ions can be deposited on the surface of the pellets. Generally, the acidic accelerator is about a 1 to about a 5 N hydrochloric acid solution comprised of hydrochloric acid in water.

In addition, commercially available acidic accerelators may be employed, such as MacDermid 9369, which is available from the MacDermid Company.

The pellets are usually immersed in the acidic accelerator solution for a period of time in the range of about 0.5 minute to about 5 minutes, and preferably 0.5 minute to about 3 minutes. After being removed from the solution, the pellets are rinsed.

Next, the pellets are coated with a metal coating or layer. The pellets can be coated with virtually any metal. Preferably, however, the pellets are coated with nickel, copper or silver, and most preferably are coated with nickel or copper. The pellets are usually immersed in a bath in order to coat them. Generally, an electroless metal bath is employed.

The preparation of such baths is well known in the art. Most preferably a nickel or copper bath is employed. An example of a suitable nickel bath is one containing 84 grams of sodium citrate, 30 grams of nickel chloride, 10 grams of sodium hypophosphite and 50 grams of ammonium chloride per liter of water and a sufficient amount of ammonium hydroxide to maintain a pH in the range of about 8 to about 11. An example of a suitable copper bath is one comprised of 3.6 grams/liter of copper (II) sulfate, 25 grams/liter of sodium potassium tartrate, 3.8 grams/liter of sodium hydroxide, and 10 grams/liter of 37% formaldehyde solution.

The pellets remain in the metal bath for a period of time sufficient to permit the deposition of about 10 to about 50 percent by weight metal on the pellet based upon the total weight of the plastic pellet and metal coating. Preferably, the pellet will have about 15 to about 25 percent by weight metal after being coated. For example, polyacetal spheres having a diameter of about 0.11 inch and weighing about 0.019 gram each will have about 22 percent by weight metal if the metal coating is about 1 mil thick. In order to sufficiently coat the pellets, the pellets are generally immersed in the metal bath for a period of about 5 to about 10 minutes.

The metal adheres firmly to the acetal resin article because of the presence of the palladium nucleii on the surface of the article which help to reduce the metal ions.

After the pellets are coated with a sufficient amount of metal, they are used to prepare conductive plastic articles. Although the coated pellets alone can be used to prepare a conductive article, the coated pellets are generally mixed with non-metal coated plastic which can be in any shape or form. Preferably, the coated pellets are mixed with non-coated plastic pellets. The coated pellets are preferably mixed with the same plastic from which the coated pellets are formed, but they may also be mixed with plastic resins which are compatible with the plastic employed to prepare the metal coated pellets. The conductive plastic articles of this invention generally contain about ½ to about 40 percent by weight metal based upon the total weight of the metal containing article.

The coated plastic pellets can be placed in molds with non-coated plastic pellets and then heated, preferably under pressure, to form molded, shaped articles. Since the coated and non-coated pellets generally have similar densities, a fairly uniform distribution or mixture of the two can generally be achieved within a mold. As a result, as the plastic pellets melt, the metal coating will tend to be uniformally dispersed throughout the finished article. This is in contrast to some of the prior art articles in which a metal powder is mixed with a plastic resin to form an article. Due to the much greater density of the metal powder, it can settle and congregate and thereby result in a non-uniform distribution of metal within the finished article.

The conductive plastic articles which are prepared by the process of this invention can be employed in a wide variety of end uses. Due to the conductive nature of the articles, they can be employed to reduce static buildup in various machines and articles. For example, they can be used to prepare medical instruments, conveyor belts, and video and audio parts, such as hubs and rollers. The invention is illustrated by the following examples.

EXAMPLE 1

To 98 grams of Celcon® resin, which is an acetal copolymer available from Hoechst Celanese Corporation, are added 2 grams of calcium carbonate. The resin and calcium carbonate are mixed by extrusion from a single screw extruder to form strands. The strands are cooled in water and are chopped by rotating knife blades within the water bath to form spherical pellets having diameters of about 0.11 inch and weighing about 0.019 grams each. The pellets are then placed for fifteen minutes in a 77° F. acid bath to etch the surface of the pellets. The bath is comprised of 35% by volume sulfuric acid, 15% by volume hydrochloric acid (35%) and 50% by volume water based upon the total volume of the bath. The pellets are then removed from the bath, rinsed and immersed in a sodium hydroxide bath to neutralize the acid. The pellets are then rinsed with water.

Next, the pellets are immersed in a palladium-tin catalyst solution of MacDermid D-34. The pellets remain in the solution for about 3 minutes, whereupon they are removed from the solution and rinsed.

The pellets are then placed in an acidic accelerator solution of MacDermid 9369. The pellets are left in the solution for about 1 minute and then removed and rinsed. The pellets are then immersed in an electroless nickel bath to deposit nickel on the surface of the article. The bath is prepared by dissolving 84 grams of sodium citrate, 30 grams of nickel chloride, 10 grams of sodium hypophosphite, and 50 grams of ammonium chloride in one liter of water, and then adding a sufficient amount of ammonium hydroxide to maintain the pH between about 8 and about 11. The solution is maintained between a temperature of 65° C. and 75° C. The pellets remain in the nickel bath until there is about a 1 mil coating on the pellets.

After the pellets are coated, 50 grams of the coated pellets are uniformly mixed iwth 50 grams of non-coated polyacetal pellets having similar dimensions and placed in a mold. The pellets are heated under pressure to form a conductive plastic article.

EXAMPLE 2

Example 1 is repeated except that the pellets are coated with nickel. A bath comprised of 3.6 grams/liter of copper (II) sulfate, 25 grams/liter of sodium potassium tartrate, 3.8 grams/liter of sodium hydroxide, and 10 grams/liter of 37% formaldehyde solution is employed.

EXAMPLE 3

Example 1 is repeated except that instead of using MacDermid D-34 and MacDermid 9369 solutions, a palladium-tin catalyst solution comprised of 1.5 grams of palladium chloride, 100 grams of stannous chloride and 280 milliliters of 37% hydrochloric acid per liter of water, and an acidic accelerator solution of hydrochloric acid and water having a normality of three are used.

What is claimed:

1. A process for preparing a conductive plastic article which comprises the steps of:
   (1) preparing plastic pellets;
   (2) etching the pellets in an etching bath;
   (3) coating the pellets with metal;
   (4) heating the coated plastic pellets to form a conductive article.

2. The process of claim 1 wherein the plastic is a platable grade thermoplastic engineering resin.

3. The process of claim 1 wherein the plastic is polyacetal.

4. The process of claim 3 wherein the etching bath is comprised of about 15 to about 50 percent by volume sulfuric acid, about 5 to about 20 percent by volume concentrated hydrochloric acid and about 30 to about 80 percent by volume water based upon the total volume of the bath.

5. The process of claim 3 wherein the etching bath is comprised of about 35 percent by volume sulfuric acid, 15 percent by volume concentrated hydrochloric acid, and about 50 percent by volume water, based upon the total volume of the bath.

6. The process of claim 1 wherein the pellets are kept in the etching bath for a period of time in the range of about 5 to about 30 minutes.

7. The process of claim 6 wherein the time is about 15 to about 20 minutes.

8. The process of claim 1 wherein the temperature of the bath is in the range of about 60° F. to about 90° F.

9. The process of claim 8 wherein the temperature of the bath is in the range of about 70° F. to about 80° F.

10. The process of claim 3 wherein the pellets contain about ½ to about 10 percent by weight calcium carbonate based upon the total weight of the polyacetal resin and calcium carbonate in the pellets.

11. The process of claim 10 wherein the pellets contain about 1 to about 5 percent by weight calcium carbonate based upon the total weight of the polyacetal resin and calcium carbonate in the pellets.

12. The process of claim 1 wherein after being etched and before being coated the pellets are treated with a palladium-tin catalyst solution by immersing the pellets in a solution containing about 1.2 to about 2.5 grams of palladium chloride, about 80 to about 150 grams of stannous chloride and about 280 to about 360 milliliters of concentrated hydrochloric acid per liter of solvent.

13. The process of claim 12 wherein the palladium-tin catalyst solution contains about 1.5 to about 2.0 grams of palladium chloride, about 90 to about 110 grams of stannous chloride and about 280 to about 300 milliliters of concentrated hydrochloric acid per liter of solvent.

14. The process of claim 12 wherein the solvent is water.

15. The process of claim 13 wherein the solvent is water.

16. The process of claim 12 wherein the pellets are immersed in the solution for a period of time in the range of about 1 to about 5 minutes.

17. The process of claim 16 wherein the time is in the range of about 2 to about 3 minutes.

18. The process of claim 12 wherein the pellets are treated with an acidic accelerator prior to being coated with a metal coating.

19. The process of claim 18 wherein the acidic accelerator is hydrochloric acid.

20. The process of claim 1 wherein the pellets are electrolessly coated.

21. The process of claim 1 wherein the pellets are coated with silver, nickel, or copper.

22. The process of claim 20 wherein the pellets are coated by immersing them in an electroless nickel-phosphorous bath.

23. The process of claim 20 wherein the pellets are coated by immersing them in an electroless copper bath.

24. The process of claim 1 wherein the coated pellets are comprised of about 10 to about 50 percent by weight metal based upon the total weight of the plastic pellets and metal.

25. The process of claim 1 wherein the metal coated pellets are comprised of about 15 to about 25 percent by weight metal based upon the total weight of the plastic pellets and metal.

26. The process of claim 1 wherein the conductive article contains about ½ to about 40 percent by weight metal based upon the total weight of the metal containing article.

27. A process for preparing a conductive polyacetal article which comprises the steps of:
   (1) preparing polyacetal pellets;

(2) etching the pellets in an etching bath comprised of about 15 to about 50 percent by volume sulfuric acid, about 5 to about 20 percent by volume concentrated hydrochloric acid, and about 30 to about 80 percent by volume water based upon the total volume of the bath;

(3) treating the pellets with a palladium-tin catalyst solution;

(4) treating the pellets with an acidic accelerator;

(5) coating the pellets with metal; and (6) heating the coated pellets to form a conductive polyacetal article.

28. The process of claim 27 wherein the etching bath is comprised of about 35 percent by volume sulfuric acid, about 15 percent by volume concentrated hydrochloric acid, and about 50 percent by volume water based upon the total volume of the bath.

29. The process of claim 27 wherein the pellets are kept in the etching bath for a period of time in the range of about 5 to about 30 minutes.

30. The process of claim 29 wherein the time is about 15 to about 20 minutes.

31. The process of claim 27 wherein the temperature of the bath is the range of about 60° F. to about 90° F.

32. The process of claim 27 wherein the temperature of the bath is in the range of about 70° F. to about 80° F.

33. The process of claim 27 wherein the pellets contain about ½ to about 10 percent by weight calcium carbonate based upon the total weight of polyacetal resin and calcium carbonate in the pellets.

34. The process of claim 27 wherein the pellets contain about 1 to about 5 percent by weight calcium carbonate based upon the total weight of the polyacetal resin and calcium carbonate in the pellets.

35. The process of claim 27 wherein the pellets are treated with a palladium-tin catalyst solution by immersing the pellets in a solution containing about 1.2 to about 2.5 grams of palladium chloride, about 80 to about 150 grams of stannous chloride and about 280 to about 360 milliliters of concentrated hydrochloric acid per liter of solvent.

36. The process of claim 35 wherein the palladium-tin catalyst solution contains about 1.5 to about 2.0 grams of paladium chloride, about 90 to about 110 grams of stannous chloride and about 280 to about 300 milliliters of concentrated hydrochloric acid per liter of solvent.

37. The process of claim 35 wherein the solvent is water.

38. The process of claim 36 wherein the solvent is water.

39. The process of claim 35 wherein the pellets are immersed in the solution for a period of time in the range of about 1 to about 5 minutes.

40. The process of claim 35 wherein the time is in the range of about 2 to about 3 minutes.

41. The process of claim 27 wherein the acidic accelerator is hydrochloric acid.

42. The process of claim 27 wherein the pellets are coated with silver, nickel or copper.

43. The process of claim 27 wherein the pellets are electrolessly coated.

44. The process of claim 43 wherein the pellets are coated by immersing them in an electroless nickel-phosphorous bath.

45. The process of claim 43 wherein the pellets are coated by immersing them in an electroless copper bath.

46. The process of claim 27 wherein the pellets are comprised of about 10 to about 50 percent by weight metal based upon the total weight of the polyacetal pellets and metal.

47. The process of claim 27 wherein the pellets are comprised of about 15 to about 25 percent by weight metal based upon the total weight of the polyacetal pellets and metal.

48. The process of claim 27 wherein the conductive article contains about ½ to about 40 percent by weight metal based upon the total weight of the conductive article.

* * * * *